United States Patent
Habib et al.

(10) Patent No.: US 8,820,312 B2
(45) Date of Patent: Sep. 2, 2014

(54) OXYGEN TRANSPORT REACTOR-BASED OVEN

(75) Inventors: Mohamed Abdel-Aziz Habib, Dhahran (SA); Esmail M. A. Mokheimer, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 386 days.

(21) Appl. No.: 13/312,926

(22) Filed: Dec. 6, 2011

(65) Prior Publication Data

US 2013/0139810 A1 Jun. 6, 2013

(51) Int. Cl.
*A21B 1/10* (2006.01)
*A21B 1/48* (2006.01)
*F24C 3/04* (2006.01)
*F23C 9/00* (2006.01)
*F23L 15/00* (2006.01)

(52) U.S. Cl.
USPC ............ 126/273.5; 126/92 C; 126/19 R; 126/39 C; 126/39 F; 126/39 D; 95/54; 96/8; 96/10

(58) Field of Classification Search
CPC ............ F24C 3/04; A21B 1/10; A21B 1/00; A21B 1/02; A21B 1/06; A21B 1/14; A21B 1/145; A21B 1/28; A21B 1/42; A21B 1/48; F23L 15/00; F23C 9/00
USPC .......... 96/8, 10; 95/54; 126/92 C, 19 R, 39 C, 126/39 F, 39 D, 273.5
See application file for complete search history.

(56) References Cited

U.S. PATENT DOCUMENTS

| | | | | |
|---|---|---|---|---|
| 4,121,509 A | * | 10/1978 | Baker et al. | 99/386 |
| 4,383,823 A | * | 5/1983 | Williams et al. | 432/148 |
| 4,591,333 A | * | 5/1986 | Henke | 432/10 |
| 4,951,648 A | * | 8/1990 | Shukla et al. | 126/21 A |
| 5,512,312 A | * | 4/1996 | Forney et al. | 426/523 |
| 5,888,272 A | * | 3/1999 | Prasad et al. | 95/54 |
| 5,921,771 A | | 7/1999 | Kobayashi | |

(Continued)

FOREIGN PATENT DOCUMENTS

EP  1 327 823 A2  7/2003

OTHER PUBLICATIONS

"Waste Heat Recovery 101"; printed from http://www.process-heating.com/Articles/Feature_Article/BNP_GUID_9-5-2006_A_10000000000000537841 on Nov. 7, 2011 (3 pages).

*Primary Examiner* — Kenneth Rinehart
*Assistant Examiner* — Sharla Magana
(74) *Attorney, Agent, or Firm* — Richard C Litman

(57) ABSTRACT

The oxygen transport reactor-based oven is an oven for heating articles, such as bread, using oxygen transport reactor-based combustion in order to recycle carbon dioxide, rather than releasing the carbon dioxide into the environment. The oven includes an upper furnace chamber having a plurality of oxygen transport reactors disposed therein. A mixture of fuel and gaseous carbon dioxide is delivered to the interior of each oxygen transport reactor. Pressurized air is then delivered to the upper furnace chamber, so that oxygen from the pressurized air is driven through an ion transport membrane of each oxygen transport reactor to combust with the fuel. This combustion produces carbon dioxide, water vapor and heat. The generated heat is used to heat the articles to be heated, which are received within a heating chamber positioned beneath the upper furnace chamber.

4 Claims, 2 Drawing Sheets

(56) References Cited

U.S. PATENT DOCUMENTS

| | | | |
|---|---|---|---|
| 5,942,142 A * | 8/1999 | Forney et al. | 219/388 |
| 5,980,840 A * | 11/1999 | Kleefisch et al. | 422/211 |
| 6,010,614 A * | 1/2000 | Keskar et al. | 205/765 |
| 6,227,189 B1 * | 5/2001 | Dougherty | 126/21 A |
| 6,309,612 B1 * | 10/2001 | Balachandran et al. | 422/222 |
| 6,394,043 B1 * | 5/2002 | Bool et al. | 122/488 |
| 6,403,041 B1 * | 6/2002 | Takahashi et al. | 422/240 |
| 6,539,719 B2 | 4/2003 | Prasad et al. | |
| 6,562,104 B2 * | 5/2003 | Bool et al. | 95/54 |
| 6,868,677 B2 * | 3/2005 | Viteri et al. | 60/784 |
| 6,921,596 B2 * | 7/2005 | Kelly et al. | 429/425 |
| 6,997,703 B2 * | 2/2006 | Kurashima et al. | 432/13 |
| 7,125,528 B2 * | 10/2006 | Besecker et al. | 422/211 |
| 7,282,171 B2 | 10/2007 | Gross | |
| 7,335,247 B2 * | 2/2008 | Stein et al. | 96/7 |
| 7,384,452 B2 * | 6/2008 | Sirman et al. | 95/54 |
| 7,556,675 B2 * | 7/2009 | Carolan et al. | 96/7 |
| 8,114,193 B2 * | 2/2012 | Stein et al. | 95/54 |
| 8,117,822 B2 * | 2/2012 | Habib et al. | 60/39.181 |
| 2004/0011048 A1 * | 1/2004 | Linder et al. | 60/772 |
| 2004/0224210 A1 * | 11/2004 | Agnew | 429/34 |
| 2006/0169271 A1 * | 8/2006 | Randall | 126/21 A |
| 2006/0180022 A1 * | 8/2006 | Holmes et al. | 95/45 |
| 2007/0137633 A1 * | 6/2007 | McFadden | 126/21 A |
| 2007/0237696 A1 * | 10/2007 | Payton | 423/228 |
| 2008/0022993 A1 * | 1/2008 | Moretti | 126/21 A |
| 2008/0169449 A1 * | 7/2008 | Mundschau | 252/373 |
| 2009/0258278 A1 * | 10/2009 | Steinberg | 429/34 |
| 2010/0058936 A1 * | 3/2010 | Schjerven et al. | 99/443 C |
| 2010/0162619 A1 * | 7/2010 | Peus | 44/605 |
| 2011/0131946 A1 | 6/2011 | Habib et al. | |
| 2011/0132280 A1 | 6/2011 | Habib et al. | |
| 2011/0142722 A1 * | 6/2011 | Hemmings et al. | 422/149 |

* cited by examiner

OXYGEN TRANSPORT REACTOR-BASED OVEN

BACKGROUND OF THE INVENTION

1. Field of the Invention

The present invention relates to combustion-based ovens, furnaces and the like, particularly to bakery ovens, and more particularly to an oxygen transport reactor-based oven that minimizes carbon dioxide emissions in the combustion process.

2. Description of the Related Art

Combustion-type ovens, furnaces, and the like generate heat through combustion of a hydrocarbon fuel, such as methane, propane or the like, producing large quantities of carbon dioxide as a combustion product. This carbon dioxide is then released directly back into the environment. Carbon dioxide, however, is a known greenhouse gas, and the increase in carbon dioxide emissions from combustion processes has been directly linked to global climate change. It would be desirable to provide a combustion type oven or furnace for the baking of bread or the like that minimizes carbon dioxide emissions. Thus, an oxygen transport reactor-based oven solving the aforementioned problems is desired.

SUMMARY OF THE INVENTION

The oxygen transport reactor-based oven is an oven for heating articles, such as bread, using oxygen transport reactor-based combustion in order to recycle carbon dioxide, rather than releasing the carbon dioxide into the environment. The oxygen transport reactor-based oven includes an upper furnace chamber defining an open interior region and a plurality of oxygen transport reactors disposed within the open interior region of the upper furnace chamber. A mixture of fuel and gaseous carbon dioxide is delivered to the interior of each of the oxygen transport reactors.

Pressurized air is then delivered to the open interior region of the upper furnace chamber, so that oxygen from the pressurized air is driven through an ion transport membrane of each oxygen transport reactor to combust with the fuel within the interior thereof. This combustion produces carbon dioxide, water vapor and heat. The heat generated during combustion is used to heat the articles to be heated, which are disposed within a heating chamber positioned beneath the upper furnace chamber.

A radiator plate, which is formed from a thermally conductive material, separates the lower portion of the upper furnace chamber from the upper portion of the heating chamber so that the heat generated by the combustion process heats the radiator plate, and the heated radiator plate heats the articles within the heating chamber.

The heated water vapor and gaseous carbon dioxide are then removed from the interiors of the oxygen transport reactors following the combustion of the fuel. The combustion products are passed to a heat exchanger, which then transfers heat from the water vapor and the gaseous carbon dioxide to the pressurized air delivered to the open interior region of the upper furnace chamber, thus recycling heat and at least partially conserving the energy required to heat the pressurized air.

The water vapor and the gaseous carbon dioxide are then cooled, after passing through the heat exchanger, to produce liquid water from the water vapor for removal thereof The gaseous carbon dioxide is then recycled and delivered in the form of the mixture of the fuel and the gaseous carbon dioxide to the interior of each oxygen transport reactor as part of a continuous combustion cycle.

When used as an oven for food articles, in particular, a lower chamber is preferably positioned beneath the heating chamber, and an upper portion of a continuous drive belt passes through the heating chamber for carrying the articles to be heated. A lower portion of the continuous drive belt passes through the lower chamber. Following removal of oxygen from the pressurized air, gaseous nitrogen remains within the upper furnace chamber. This gaseous nitrogen is heated by the combustion, and then is then removed from within the upper furnace chamber and is delivered to the lower chamber for heating of the lower portion of the continuous drive belt. This allows heating of the articles from above by the radiator plate, and cooking from below by the heated continuous drive belt. Following heating of the drive belt, the nitrogen may then be released back into the environment.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
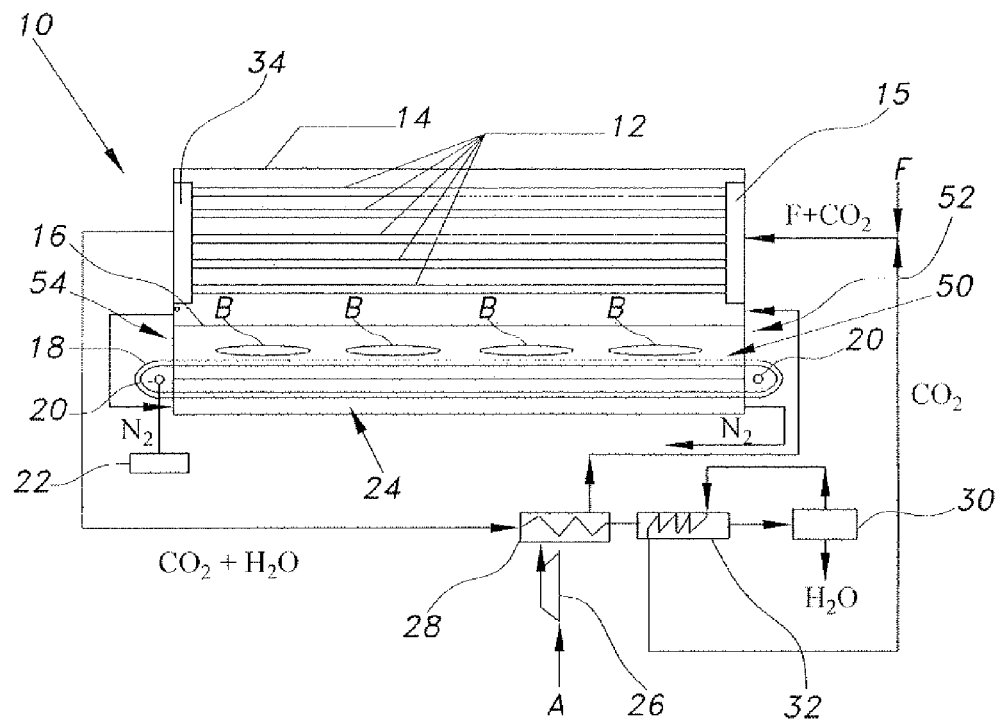
FIG. 1 is a diagrammatic side view of an oxygen transport reactor-based oven according to the present invention, in particular, a bakery oven for baking bread.

As best shown in FIG. 1, the oxygen transport reactor-based oven 10 is an oven for heating articles, such as the exemplary loaves of bread B, using oxygen transport reactor-based combustion in a configuration designed to recycle carbon dioxide from the combustion products, rather than releasing the carbon dioxide into the environment. However, it should be understood that the oven 10 may be used for cooking or heating any suitable type of article or foodstuff.

Figure 2:
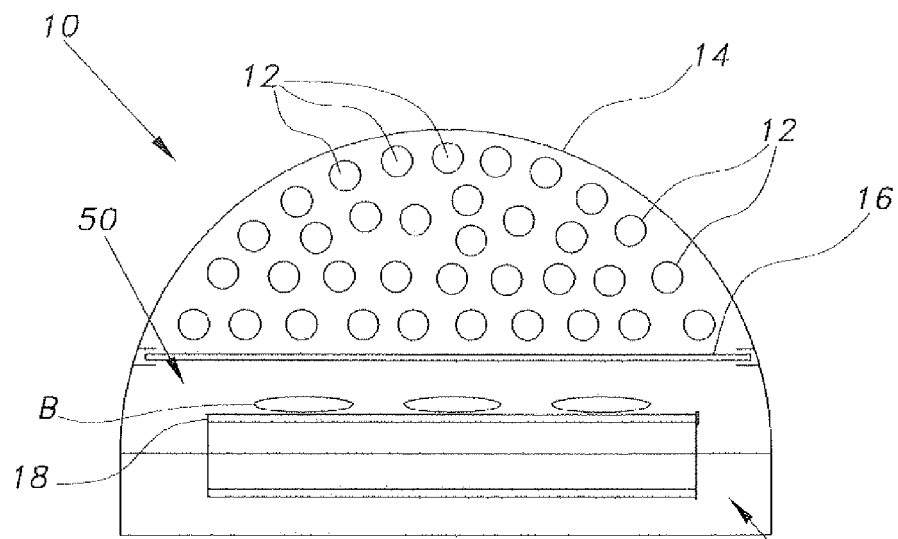
FIG. 2 is a diagrammatic front view of the oxygen transport reactor-based oven of FIG. 1.

As shown in FIGS. 1 and 2, the oxygen transport reactor-based oven 10 includes an upper furnace chamber 14, defining an open interior region, and a plurality of oxygen transport reactors 12 disposed within the open interior region of the upper furnace chamber 14. A mixture of fuel F and gaseous carbon dioxide ($CO_2$) is delivered to the interior of each of the oxygen transport reactors 12 by a fuel distributor 15.

Figure 3:
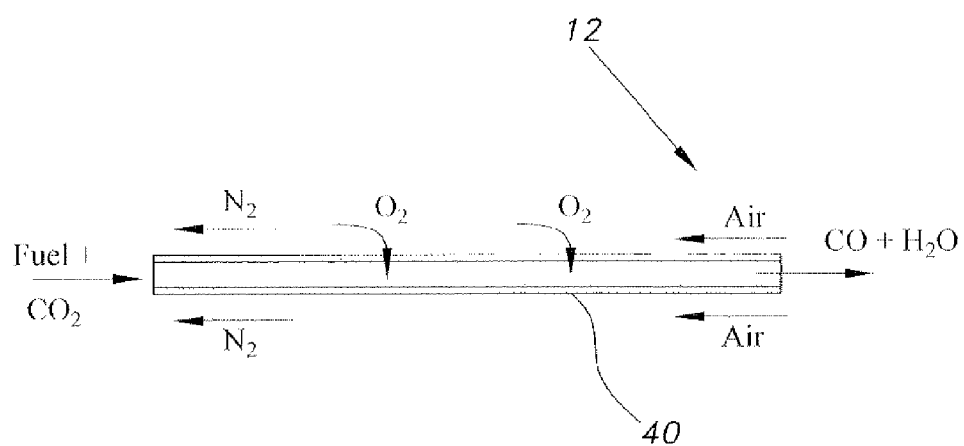
FIG. 3 is a diagrammatic side view of a single oxygen transport reactor that may be used in the oxygen transport reactor-based oven of FIG. 1.

Pressurized air A is delivered to the open interior region of the upper furnace chamber 14. As shown in FIG. 3, each oxygen transport reactor 12 is formed from an ion transport membrane 40, which is rolled into a hollow cylindrical tube (as is known in the field of oxygen transport reactors). The ion transport membrane 40 may be a ceramic membrane or any other suitable type of ion transport membrane commonly used in oxygen transport reactors. Oxygen ($O_2$) from the pressurized air is driven through the ion transport membrane 40 of each oxygen transport reactor 12 to combust with the fuel F within the interior thereof. The fuel may be any combustible hydrocarbon, such as methane, propane or the like. This combustion produces carbon dioxide, water vapor ($H_2O$) and heat. The ion transport membrane 40 separates pure oxygen from the pressurized air A, which is then transported across the membrane thickness to the surface inside the membrane. As is known in the field of oxygen transport reactors, the oxygen flux is proportional to the pressure ratio of the oxygen on the outer surface of membrane 40 to that on the inner surface thereof. The flux of oxygen across the ion transport membrane 40 depends on the high partial pressure of oxygen contained in the air A (surrounding the membrane outer surface) and the low partial pressure of the oxygen on the other side (i.e., inside of the cylindrical membrane). The rate at which oxygen is separated depends on the partial pressure ratio of $O_2$ across the membrane 40.

The continuous combustion of oxygen, as it transports through the membrane thickness, with fuel F results in a continuous low oxygen partial pressure of oxygen at the inner surface of the membrane 40. Thus, the ratio of the partial pressures of the oxygen across the sides of the membrane 40 remains high to ensure a high flux rate of oxygen separation. Mixing the $CO_2$ with the fuel F provides purging of oxygen within the reactor 12, thus ensuring low oxygen concentration on the fuel side of the reactor (i.e., internal to the reactor 12), which enhances the process of separation of oxygen external to the reactor and increases the oxygen flux rate in the region close to the inlet section of fuel flow. The heat generated by the combustion is used to heat the articles to be heated, which are received within a heating chamber 50 positioned beneath the upper furnace chamber 14. The fuel F and gaseous carbon dioxide are injected into the interiors of the plurality of oxygen transport reactors 12 by any suitable type of fuel distributor 15.

A radiator plate 16, formed from a thermally conductive material, such as metal, separates the lower portion of the upper furnace chamber 14 from an upper portion of the heating chamber 50, so that the heat generated by the combustion process heats the radiator plate 16, and the heated radiator plate 16 heats the articles within the heating chamber 50 from above.

The heated water vapor and gaseous carbon dioxide are removed from the interiors of the oxygen transport reactors 12 following the combustion of the fuel F. The combustion products may be drawn out by any suitable type of collector 34, such as a fan or the like, which preferably merges the combustion products from each oxygen transport reactor 12 into a single pressurized stream. The combustion products, which are heated by the combustion process, are passed to a heat exchanger 28, which then transfers heat from the water vapor and the gaseous carbon dioxide to the pressurized air A delivered to the open interior region of the upper furnace chamber 14, thus recycling heat and at least partially conserving the energy required to heat the pressurized air A. The air A may be drawn from the environment and pass through a compressor 26, a fan or the like in order to pressurize the air A prior to the heating thereof by heat exchanger 28.

The water vapor and the gaseous carbon dioxide are then cooled by a cooler or chiller 32, after passing through the heat exchanger 28, to produce liquid water from the water vapor, which is then separated out in a separator 30, and removed back into the environment. The gaseous carbon dioxide, still under pressure from the collector 34, is then recycled and delivered (in the form of the mixture of the fuel F and the gaseous carbon dioxide) to the interior of each oxygen transport reactor 12 as part of a continuous combustion cycle.

When used as an oven for food articles, in particular, (such as exemplary loaves of bread B), a lower chamber 24 is preferably positioned beneath the heating chamber 50, and an upper portion of a continuous drive belt 18 passes through the heating chamber 50 for carrying the articles to be heated. A lower portion of the continuous drive belt 18 passes through the lower chamber 24. The articles are placed on the belt through an inlet 52 and are then removed, after heating, through an outlet 54.

Following removal of oxygen from the pressurized air in upper furnace chamber 14, gaseous nitrogen ($N_2$) remains within the upper furnace chamber 14 external to the oxygen transport reactors 12. This gaseous nitrogen is heated by the combustion process, and then is removed from within the upper furnace chamber 14 and is delivered to the lower chamber 24 for heating of the lower portion of the continuous drive belt 18. This allows heating of the articles from above by the radiator plate 16, and cooking from below by the heated continuous drive belt 18. Following heating of the drive belt 18, the nitrogen gas may then be released back into the environment, or alternatively, may be collected and recycled in fertilizers, fire fighting materials, or the like. The drive belt 18 is preferably mounted on wheels 20 or the like, which may be driven by any suitable type of motor 22 or the like.

As described above, the exhaust gases are a mixture of carbon dioxide and water vapor, which can be easily separated without the need of any chemical processing, thus conserving the energy required to separate carbon dioxide from the exhaust gases (which typically contain nitrogen) in conventional post-combustion carbon capture furnaces. In oven 10, the fuel F is combusted with pure oxygen, resulting from the separation of oxygen by the ion transport membrane ceramic-based reactors 12. This results in elevated temperatures of the exhaust gases at the exit of the furnace chamber 14. In order to provide the ballasting effect of the absent nitrogen and moderate the exhaust gas temperatures, recirculation of the flue gas ($CO_2$ and $H_2O$) is performed, thus allowing for the recycling of the carbon dioxide, a known greenhouse gas, which is re-mixed with the fuel F.

Recycling of the carbon dioxide allows for the utilization of the carbon dioxide and aids in carbon capture, thus minimizing carbon dioxide emission to the environment. Further, the recycling of the carbon dioxide and the mixing of the carbon dioxide with the fuel F provides heating of the fuel F, thus producing a higher temperature of the fuel being input into the furnace. This higher temperature enhances the oxygen flux across the membrane thickness of each oxygen transport reactor, particularly near the distributor 15. The higher temperature is also essential for the combustion stability in the entrance region of the furnace. Thus, a relatively uniform temperature along the membrane 40 is produced, minimizing membrane thermal stresses.

It is to be understood that the present invention is not limited to the embodiments described above, but encompasses any and all embodiments within the scope of the following claims.

We claim:

1. An oxygen transport reactor-based oven, comprising:
    an upper furnace chamber defining an open interior region;
    a plurality of oxygen transport reactors disposed within the open interior region of the upper furnace chamber, each of the oxygen transport reactors having an ion transport membrane for unidirectional passage of oxygen through the membrane;
    means for delivering a mixture of fuel and gaseous carbon dioxide to an interior of each of the oxygen transport reactors;
    means for delivering pressurized air to the open interior region of the upper furnace chamber, whereby oxygen from the pressurized air is driven through the ion transport membrane of each of the oxygen transport reactors to combust with the fuel within the interior thereof, the combustion generating heat;

a heating chamber for receiving articles to be heated;

a radiator plate formed from a thermally conductive material separating a lower portion of the upper furnace chamber from an upper portion of the heating chamber, whereby the heat generated by the combustion heats the radiator plate, the heated radiator plate heating the articles within the heating chamber;

a lower chamber positioned beneath the heating chamber;

a continuous drive belt configured in a loop having an upper portion passing through the heating chamber for carrying the articles to be heated, and a lower portion passing through the lower chamber;

means for removing gaseous nitrogen from the upper furnace chamber, the gaseous nitrogen being heated by the combustion; and means for delivering the gaseous nitrogen removed from the upper furnace chamber to the lower chamber for heating the lower portion of the continuous drive belt.

2. The oxygen transport reactor-based oven as recited in claim 1, further comprising means for removing water vapor and the gaseous carbon dioxide from the interior of each said oxygen transport reactor following the combustion of the fuel.

3. The oxygen transport reactor-based oven as recited in claim 2, further comprising a heat exchanger for transferring heat from the water vapor and the gaseous carbon dioxide removed from the interior of each said oxygen transport reactor to the pressurized air delivered to the open interior region of said upper furnace chamber.

4. The oxygen transport reactor-based oven as recited in claim 3, further comprising means for cooling the water vapor and the gaseous carbon dioxide after passing through the heat exchanger to produce liquid water from the water vapor for removal thereof, the gaseous carbon dioxide being recycled by said means for delivering the mixture of the fuel and the gaseous carbon dioxide to the interior of each said oxygen transport reactor.

* * * * *